United States Patent
Kashima

(10) Patent No.: US 7,996,340 B2
(45) Date of Patent: Aug. 9, 2011

(54) METHOD AND SYSTEM FOR $L_1$-BASED ROBUST DISTRIBUTION CLUSTERING OF MULTINOMIAL DISTRIBUTIONS

(75) Inventor: Hisashi Kashima, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 11/959,697

(22) Filed: Dec. 19, 2007

(65) Prior Publication Data

US 2009/0164479 A1 Jun. 25, 2009

(51) Int. Cl.
*G06F 15/18* (2006.01)
(52) U.S. Cl. .................. 706/12; 705/8; 705/10
(58) Field of Classification Search .............. 705/8, 9, 705/10; 706/20, 12
See application file for complete search history.

(56) References Cited

U.S. PATENT DOCUMENTS

| | | | |
|---|---|---|---|
| 2004/0162753 A1* | 8/2004 | Vogel et al. | 705/10 |
| 2007/0094061 A1* | 4/2007 | Hu et al. | 705/8 |
| 2008/0162487 A1* | 7/2008 | Richter | 707/10 |
| 2008/0183553 A1* | 7/2008 | Cao et al. | 705/10 |

FOREIGN PATENT DOCUMENTS

EP 0294116 A2 12/1988

OTHER PUBLICATIONS

Nascimento, S.; Mirkin, B.; Moura-Pires, F.; , "A fuzzy clustering model of data with proportional membership," Fuzzy Information Processing Society, 2000. NAFIPS. 19th International Conference of the North American , vol., no., pp. 261-266, 2000.*
Groenen P, Kaymak U, van Rosmalen J. Fuzzy clustering with Minkowski distance functions. In: OliveiraVJ, Pedrycz W, eds. Advances in Fuzzy Clustering and its Applications. Chichester, West Sussex: John Wiley & Sons; 2007.*
Thomas P. Minka, "Estimating a Dirichlet Distribution" Feb. 27, 2003.
"Computational Complexity", Mathematical Foundations, Appendix A, p. 633.

* cited by examiner

*Primary Examiner* — Jeffrey A Gaffin
*Assistant Examiner* — David H Kim
(74) *Attorney, Agent, or Firm* — Scully, Scott, Murphy & Presser, P.C.; Vazken Alexanian

(57) ABSTRACT

A workforce analysis method for solving $L_1$-based clustering problem of multinomial distributions of workforce data includes acquiring workforce allocation data, arranging the workforce allocation data in sets of fraction data with respect to the $L_1$ distances, clustering the sets of fraction data t corresponding set of cluster centers, or $L_1$ distances for each set, minimizing the sets of fraction data based on the cluster centers or $L_1$ distances and outputting analysis results of the clustering problem.

7 Claims, 2 Drawing Sheets

US 7,996,340 B2

METHOD AND SYSTEM FOR $L_1$-BASED ROBUST DISTRIBUTION CLUSTERING OF MULTINOMIAL DISTRIBUTIONS

BACKGROUND OF THE INVENTION

The present invention relates broadly to classifying or partitioning data, and more particularly relates to robust $L_1$-based distributional clustering of multinomial distributions, and a workforce analysis method and workforce management system that implements the $L_1$-based distributional clustering to support human resources allocation based on the clustering.

Clustering is a technique for the classification or partitioning of a data set into different subsets or clusters so that the data in each subset shares some common trait such as proximity with respect to some distance measure. Distance measures, for example, in $L_1$-based clustering, provide for determining a similarity of two elements, which influences the shape of the clusters. Data clustering is a common technique for statistical data analysis, where data clustering algorithms are known to be hierarchical or partitional, for example, for human resources allocation.

To solve the clustering problem an input and output must first be assumed. $x^{(i)} \in \Re^D$ is the assumed input, representing the i-th fraction data (or multinomial distribution) of D-dimensional real-valued vector. $x_d^{(i)}$ is d-th dimension value, and must be equal to or greater than 0. The i-th fraction data must satisfy a fraction constraint $$\sum_d x_d^{(i)} = 1.$$

An output $\xi^{(i)} \in \Re^D$, is the i-th cluster center.

D-dimensional real-valued vector, $\xi_d^{(i)}$ is d-th dimension value, and must be equal to or larger than 0. The i-th cluster center must satisfy a fraction constraint $$\sum_d \xi_d^{(i)} = 1.$$

One example of a clustering problem with fraction data for human resources allocation is referred to herein as the "staffing template problem," and a known solution for which will now be described in order to provide a background for the novel $L_1$-based distributional clustering of multinomial distributions of the invention. The staffing template problem expresses characteristics of a staffing project from the viewpoint of human resources. Using the perspective of the staffing template problem requires the forecast of human resources in a service contract (or staffing project) that can be performed. The staffing template problem expresses the resource allocation type of several typical projects, and represents fractions of skill and roles required in the entire project. Because it is expressed as a fraction, or multinomial distribution, the staffing template problem is expressed in such a form that all elements (fractions) when added together equal 1.

Similar clustering problems with fraction data, including the exemplary staffing template problem with fraction data, are known to be solved by first assuming that N data are available, each of which N data represents a fraction or a single trial as a multinomial distribution. That is, each fraction or one of the N data is defined by a multinomial distribution, which represents the probability distribution of the number of successes in "n" independent Bernoulli trials, which have the same probability of success on each trial. To solve the clustering problem, a set of C multinomial distributions, or C fractions, representing the entire set of multinomial data is required.

One staffing template problem expresses one project type, for example, the "development of a package", a "business transformation" problem, etc. In order to configure a staffing template problem from actual project data, for example, as an allocation of skill and role input in each project, the following conditions must be met. That is, a value of a first dimension is required to express the fraction of hours for which an architect works on the project. A value of a second dimension is required to express the fraction of hours for which an application developer works on the project. To perform a clustering of project data (which is a fraction data), the centers of the obtained clusters must be identified and used as the staffing templates.

The above-described staffing template problem, and the known techniques for solving such problems, however, are not without shortcomings. The Dirichlet distribution is the most natural probability distribution for use in generating a multinomial distribution. Accordingly, a model-based clustering method that utilizes a mixture of Dirichlet distributions represents the most natural solution. However, as is found by a review of the estimated approach in Minka, ESTIMATING A DIRICHLET DISTRIBUTION, Technical Report (2003), when performing actual model estimations, if a "0 entry" (d and i, which meets $x_d^{(i)}=0$) exists, an extreme instability in numerical calculation is caused because calculations include use of $\log x_d^{(i)}$.

Clustering based on KL distance is found in Duda, et al., Pattern Classification, Wiley-Interscience (2000), describes clustering that is based on Dirichlet distribution. The reference described both hierarchical clustering and model-based clustering using degrees of similarity among probability distributions (such as the KL distance), and information pertaining to the KL distance. However, for such distances, the 0 entry problems, and the possible instability as a result of same, still occur.

Further, as for resource allocation data of the project and other previously mentioned factors, there is a large amount of noise. Hence, the above assumption that all projects are divided into C types is not necessarily 100% correct. Accordingly, performing clustering techniques under circumstances under which there is a large amount of noise and uncertainty, a robust distributional clustering is required. And in order to perform clustering on a regular basis, or performing clustering interactively for data stored in a huge database (which may be updated daily), an effective clustering method for efficiently processing large data is a desirable goal. That is, what would be desirable in the field of solving clustering problems such as the staffing template problem is an $L_1$-based distributional clustering method and system for fraction data (multinomial distribution), which can appropriately treat a 0 entry that is both "robust" and "effective".

SUMMARY OF INVENTION

To that end, the present invention solves the above-mentioned problems by implementation of a novel algorithm for $L_1$-based distributional clustering of multinomial distributions, a workforce analysis method for allocating human resources and workforce management system that implements such a method with a number of constraints. A first approach for performing clustering of fraction data in both the $L_1$-based distributional clustering algorithm, the workforce analysis method and/or executable application for implementing the workforce analysis method, and workforce management system that implements same method is based on a minimization of the $L_1$ distance and is therefore inherently robust. Through clustering with constraints, the representative point of the cluster, i.e., the $L_1$ distance, can be guaranteed to be a fraction, and there is no deleterious effect arising from the "zero probability" problem.

The inventive algorithm, workforce analysis method and system for implementing same automatically implement and solve the minimization problem of $L_1$ (distance) with constraint of a single equality. When compared with known methods on minimizing and $L_1$ distance based on linear programming, the number of variables required to be operated upon is remarkably small, enabling high-speed processing, using structure inherent to the problem to assure that results are fractions.

BRIEF DESCRIPTION OF THE DRAWING FIGURES

The foregoing and other objects, aspects and advantages will be better understood from the following detailed description of embodiments of the inventions, with reference to the drawings, in which.

DETAILED DESCRIPTION OF THE INVENTION

Figure 1:
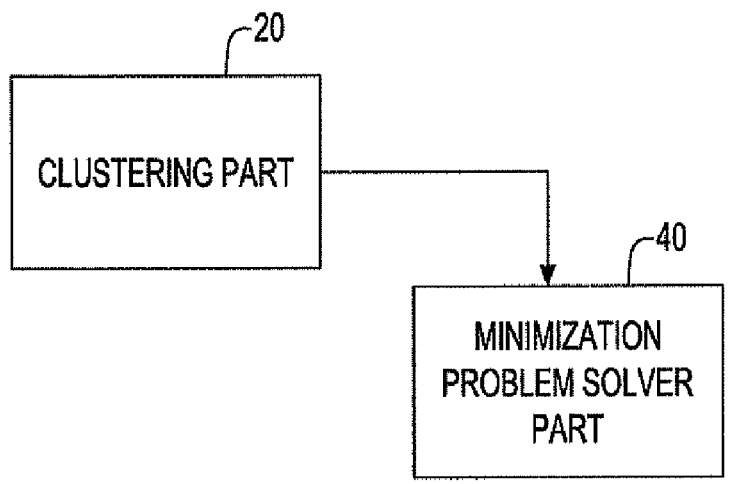
FIG. 1 is a schematic block diagram representative of a novel algorithm for $L_1$-based distributional clustering of multinomial distributions.

A novel algorithm for $L_1$-based distributional clustering of multinomial distributions, a workforce analysis method for allocating human resources and workforce management system that implements such a method with a number of constraints are set forth and described herein for the purpose of conveying the broad inventive concepts. The drawings and descriptions provided are not meant to limit the scope and spirit of the invention in any way. To that end, reference will now be made in detail to the present invention, examples of which are illustrated in the accompanying drawings, wherein like reference numerals refer to like elements throughout.

The novel algorithm for $L_1$-based distributional clustering of multinomial distributions of the present invention for implementing the novel $L_1$-based distributional clustering of multinomial distributions may be described as two functional elements or parts, shown in the functional block diagram of FIG. 1. A first element of the algorithm is defined as a clustering part (20), and a second element or part of the novel system is defined as a minimization problem solver part (40). The minimization problem solver part (40) is related to the clustering part (20).

To implement the novel L-based robust distributional clustering of multinomial distributions, the clustering part (20) first receives input data, which is a set of fraction data, or multinomial distributions. The clustering part processes this input set of fraction data (as will be described in great detail below), and outputs a plurality of cluster centers (and accompanying probability models). The plurality of cluster centers output from the clustering part must meet the constraint on fractions. To meet the constraint on fractions, the clustering part relies on the minimization problem solver part a plurality of times (repeats) to process the cluster centers output from the input from the clustering part, until a solution converges.

The minimization problem solver part (40) solves minimization problems of the sum of weighted $L_1$ distances, or cluster centers processed and output by the aforementioned clustering part (20). The input and the output are as follows. The input is defined as $x^{(i)} \in \Re^D$, i=1, ..., N, and the i-th fraction data, wherein D dimensional real-valued vector, $x_d^{(i)}$, is the d-th dimension value, and must be constrained to be greater than or equal to 0, and is a "fraction", $$\sum_d x_d^{(i)} = 1.$$

The output is $\xi^{(i)} \in \Re^D$, i=1, ..., C, or i-th cluster center, wherein a D-dimensional real-valued vector, $\xi_d^{(i)}$, is d-th dimension value. The d-th dimension value is also constrained as greater than or equal to 0, is a "fraction", $$\sum_d \xi_d^{(i)} = 1.$$

In addition, all parameters are collectively written as $\Xi$.

Further, N and C are numbers of data and clusters, respectively, which are the input parameters. Formulation of the clustering problem is roughly classified into those belonging to model-based clustering, and those belonging to hierarchical clustering. With respect to the model to be specifically employed, any model known to the skilled artisan is allowed as long as it finally calls out the "minimization problem with weighted $L_1$ distances," and is robust.

In model-based clustering, the distribution of all data is expressed as a mixture of C probability distributions.

$$P(x; \Xi) = \sum_{k=1}^{C} \alpha^{(k)} p^{(k)}(x; \xi^{(k)})$$

Here, $p^{(k)}$ is the k-th probability distribution, where $$\alpha^{(k)} \geq 0, \sum_{k=1}^{C} \alpha^{(k)} = 1$$

are mixture ratios. In addition, $\xi^{(k)}$ is a parameter of the distribution. As for a concrete definition of $p^{(k)}$, a Laplace distribution is employed providing for:

$$p^{(k)} = Z^{-1} \cdot \exp(-|w \circ (x^{(i)} - \xi)|),$$

which is known to be more robust that the normal distributions, i.e., Gaussian distributions and the like. Therein, $\circ$ represents a Hadamard product, or the multiplication of each element. In addition, $$Z^{-1} := \frac{1}{2}\prod_{k=1}^{C} w_c \quad (1)$$

is a term for the normalization of $p^{(k)}$ to be a probability distribution. To be precise, since $$\sum_{d=1}^{D} x_d = 1$$

and $x \geq 0$, the probability distribution equates to $$Z(\xi) := \int_{\sum_{d=1}^{D} x_d=1, x \geq 0} \exp(-|w \circ (x^{(i)} - \xi)|)^{dx}.$$

However, since the dependency of Z on $\xi$ makes actual estimation difficult, constraint $x \geq 0$ is neglected by making $$Z := \int_{\sum_{d=1}^{D} x_d=1} \exp(-|w \circ (x^{(i)} - \xi)|) dx,$$

and dependency on $\xi$ is removed and can be treated in the same way as (1).

The form of the probability distribution $p^{(k)}$ can be compared from the viewpoint of how much penalty is incurred against a deviation from the average $\xi$. However, and as compared with a normal distribution, the Laplace distribution incurs no excess penalty against large errors, it is generally known to be stubborn and robust against deviations from the average.

In model-based clustering, the clustering problem is equivalent to the problem of maximum likelihood estimation, to obtain parameters that maximize the likelihood against data, as does the model above.

$$\Xi = \operatorname*{argmax}_{\Xi'} \sum_{i=1}^{N} \log P(x^{(i)}; \Xi')$$

$$= \operatorname*{argmax}_{\Xi'} \sum_{i=1}^{N} \log \sum_{k=1}^{C} \alpha^{(k)} p^{(k)}(x^{(i)}; \xi'^{(k)})$$

An estimation problem of this type can usually be solved by the EM algorithm, wherein a local optimal solution is guaranteed to be reached. For example, and as an analogy, the minimization problem solver corresponds to a step M of an expectation-maximization (EM) algorithm for finding maximum likelihood estimates of parameters in probabilistic models such as the above-discussed model-based clustering. That is, the "M" of the EM algorithm is the maximum likelihood estimation of each cluster from data belonging to the cluster.

This inventive minimization problem solver part, however, also supports deciding which clusters should be merged in hierarchical-type clustering. An input to the minimization problem solver is a set of fraction data with weights, i.e., constraints, or a subset of all fraction data. An output is a set of cluster centers, and the parameters of the minimization problem solver's accompanying probabilistic model, which meet the constraint of fraction.

E-Step

Under the current parameter $\Xi$, the expectation value of the affiliation variable is obtained for each (i, k), i=1, N, k=1, . . . , C.

$$y_{i,k} := \frac{p^{(k)}(x^{(i)}; \xi^{(k)})}{\sum_{k'=1}^{C} p^{(k')}(x^{(i)}; \xi^{(k')})}$$

M-Step

Under the current $y_{i, k}$, the maximum likelihood estimation value of $\alpha^{(k)}$ is obtained by:

$$\alpha^{(k)} = \frac{y_{i,k}}{\sum_{i'=1}^{N} y_{i',k}}$$

and the maximum likelihood estimation value of $\xi^{(k)}$ is obtained by:

$$\xi^{(k)} = \operatorname*{argmin}_{\xi'^{(k)}} \sum_{i=1}^{N} y_{i,k} |w \cdot (x^{(i)} - \xi'^{(k)})| \quad (2)$$

$$\text{s.t.} \quad |\xi'^{(k)}| = c, \xi'^{(k)} \geq 0$$

The EM algorithm repeats the above-mentioned two steps until convergence. Upon solving the minimization problem (2), a minimization solver is called out once.

As simple model-based clustering, there is k-means clustering. If the $L_1$ distance is employed, the minimization problem takes the form of (2) when obtaining the center or $L_1$ distance of each cluster. In such case, $y_{i,k}$ takes the value of 0 or 1.

Hierarchical clustering is a method to perform clustering in a hierarchical manner, which organizes data without assuming a model that generates data, as was seen in the model-based clustering described above. In such a hierarchical clustering process, when using the "robust" $L_1$ distance as a definition of distance, the minimization problem in the form of (2) also appears as expected. In addition, $y_{i,k}$ takes the value of 0 or 1.

The minimization problem (2) appearing in the clustering part can generally be described by the following forms. The input is defined as $-x^{(i)} \in \Re^D$, i=1, . . . , N. The i-th fraction data, where D dimensional real-valued vector, $x_d^{(i)}$ is d-th dimension value and equal to or larger than 0, is a "fraction", $\Sigma_d x_d^{(i)} = 1$. Therein, $-y^{(i)} \geq 0$, is the weight of the i-th data, and $-w \geq 0$, is the weight for each dimension ($w_d$ is the weight of the d-th dimension).

The output is defined as $\xi \in \Re^D$, the parameters to be obtained, where $\xi_d$ is the d-th dimension element, and the number of variables to be obtained is D. This problem can be described in the form of a linear programming problem; however, the number of variables will increase ((2N+1)D).

$$\operatorname*{minimize}_{\epsilon^{+(i)}, \epsilon^{-(i)} \text{ for } i=1, \ldots, N} \sum_{i=1}^{N} y^{(i)} |w \cdot (\epsilon^{+(i)} + \epsilon^{-(i)})|$$

$$\text{s.t.} \quad x^{(i)} - \xi \leq \epsilon^{+(i)}$$

$$\xi - x^{(i)} \leq \epsilon^{-(i)}$$

$$|\xi| = c, \xi \geq 0, \epsilon^{+(i)} \geq 0, \epsilon^{-(i)} \geq 0$$

In the present invention, a more "effective" solution is realized, which is specialized for solving the problem. The optimization problem may be further described as follows:

$$\text{minimize} \sum_{i=1}^{N} y^{(i)} |w \cdot (x^{(i)} - \xi)| \quad (3)$$

$$\text{s.t.} \quad \xi \quad |\xi| = e, \, \xi \geq 0 \quad (4)$$

Descriptions of algorithms that effectively solve this optimization problem will now be explained, by describing the minimization problem as follows:

$$F(\xi) = \sum_{i=1}^{N} y^{(i)} |w \cdot (x^{(i)} - \xi)| = \sum_{d=1}^{D} \sum_{i=1}^{N} y^{(i)} w_d |x_d^{(i)} - \xi_d| = \sum_{d=1}^{D} f_d(\xi_d)$$

$$f_d(\xi_d) := \sum_{i=1}^{N} y^{(i)} w_d |x_d^{(i)} - \xi_d|$$

Figure 2:
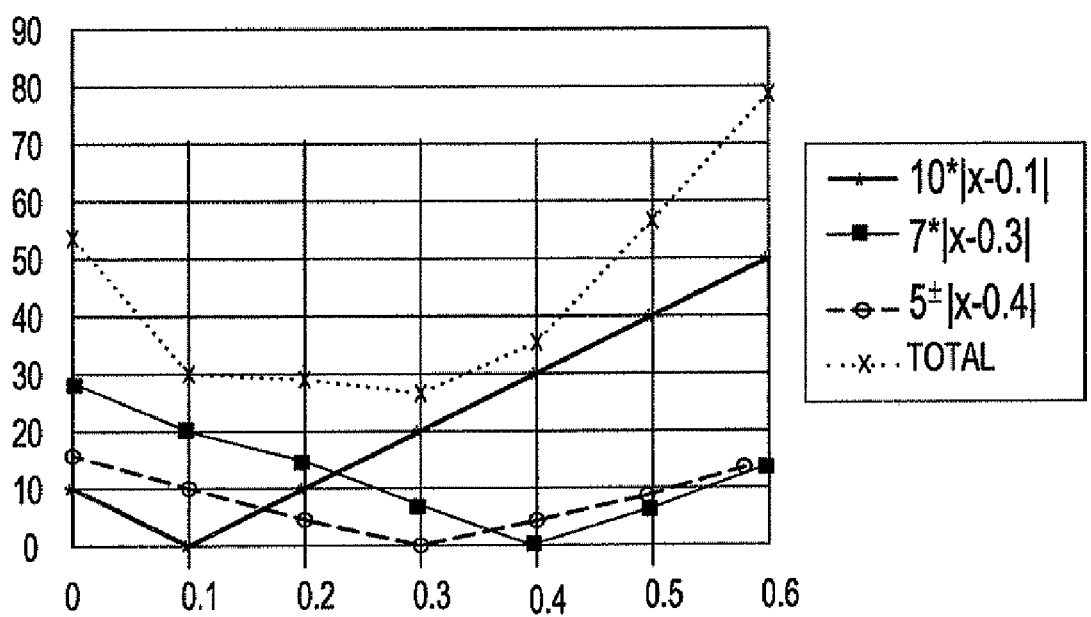
FIG. 2 is a graphical representation of $F(\xi)$, which includes a linear sum, and is also piecewise linear and convex and capable of obtaining an optimal solution by greedy optimization.

Here, regarding fd(ξd), the following properties hold for each d: piecewise linear and convex, as shown in FIG. 2. Accordingly, F(ξ), which is a linear sum of these, is also piecewise linear and convex, and therefore capable of obtaining an optimal solution by greedy optimization.

An effective optimization algorithm of the invention uses the above properties and equality constraint (4). Because of the equality constraint (4), assuming that a d and d' can be moved, when $\xi_d$ is made large (small), $\xi_{d'}$ becomes small (large) so as to compensate. Therefore, in the present solution, a combination of d and d' is found, which most greatly improves the solution, and $\xi_d$ and $\xi_{d'}$ are moved. Specifically, while an object function linearly reduces, the solution is moved.

The algorithm is described as follows. First, as preprocessing, all integers $1 \leq d \leq D$, $x_d^{(i)}$ (i=1, ..., N), are sorted in ascending order, and the index k-th is set as $r_d(k)$. ($r_d$: {1, ..., N} → {1, ..., N}. In addition, $x_d^{(r_d(0))} := -\infty$, $x_d^{(r_d(N+1))} := \infty$. For example, $x_d^{(r_d(1))}$ is the smallest among $x_d^{(i)}$ (i=1, ..., N), and $x_d^{(r_d(2))}$ is next to the smallest among $x_d^{(i)}$ (i=1, ..., N). Moreover, a combination of d and d' is found, with which the value of $g(\xi_d, \xi_{d'})$ defined in the following equation becomes the largest.

$$g(\xi_d, \xi_{d'}) := g_d^+(\xi_{d'}) - g_d^-(\xi_d)$$

If all are $g(\xi_d, \xi_{d'}) \leq 0$, current ξ is output and the algorithm is terminated. Otherwise, proceed to step 2. Here, at step 2, the maximum and minimum subgradients of $f_d(\xi_d)$ are defined as follows:

$$g_d^+(\xi_d) = \lim_{\delta \to 0+} \frac{f_d(\xi_d + \delta) - f_d(\xi_d)}{\delta}$$

$$g_d^-(\xi_d) = \lim_{\delta \to 0-} \frac{f_d(\xi_d + \delta) - f_d(\xi_d)}{\delta}$$

As long as values of $g_d^+(\xi_d)$ and $g_d^-(\xi_d)$ are not changed, an update is performed so that $\xi_d$ becomes large and $\xi_{d'}$ becomes small. Specifically, update is performed as follows. First, it is assumed that $\xi_d$ meets $x_d^{(r_d(k-1))} \leq \xi_d < x_d^{(r_d(k))}$, and $\xi_{d'}$ meet $x_{d'}^{(r_{d'}(k'))} \leq \xi_{d'} \leq x_{d'}^{(r_{d'}(k'+1))}$.

Then, when $\Delta \Delta := \min\{x_d^{(r_d(k))} - \xi_d, \xi_{d'} - x_{d'}^{(r_{d'}(k'))}\}$ is set, $\xi_d$ and $\xi_{d'}$ are updated as follows.

$$\xi_d \leftarrow \xi_d + \Delta$$

$$\xi_{d'} \leftarrow \xi_{d'} - \Delta$$

wherein the operator ← denotes substitution from the right side to left side. The following table 1 shows the experimental results.

TABLE 1

| Data (Number of cluster) | Proposed method | Comparison method |
|---|---|---|
| Oracle (Number of cluster 3) | .625 | .727 |
| Oracle (Number of cluster 4) | .544 | .664 |
| Oracle (Number of cluster 5) | .524 | .680 |
| Siebel (Number of cluster 3) | .873 | .893 |
| Siebel (Number of cluster 4) | .721 | .842 |
| Siebel (Number of cluster 5) | .659 | .734 |
| PeopleSoft (Number of cluster 3) | .670 | .727 |
| PeopleSoft (Number of cluster 4) | .568 | .664 |
| PeopleSoft (Number of cluster 5) | .522 | .644 |

That is, each numeric value as shown in Table 1 indicates the average of $L_1$ error from the center of the cluster, having the highest affiliation probability—and the smaller, the better. In that sense, it is found that the proposed method is better.

The next step is a return to step 1. That is, to supplement images in step 1, the minimum and maximum subgradients of $f_d(\xi_d)$ are gradients of the left side of the $f_d(\xi_d)$ and of the right side, respectively. Further, the combination of d and d' has an update direction of parameters to improve the solution in the largest way when trying to update by two parameters. In step 2, a concrete amount Δ of updates denotes the amount of updates until the gradient of $f_d(\xi_d)$ or $f_d(\xi_{d'})$ reaches a changing point.

As mentioned above, the present invention is robust, as indicated by the results of the following results performed using actual data. Herein, $L_1$ (absolute error) for the test data is used as its criterion for robustness. Compared with $L_2$ (Euclidean distance), $L_1$ (absolute error) incurs a larger penalty to data close to the center of the cluster and a smaller penalty to distant data. Therefore, when $L_1$ is small for data belonging to the cluster, modeling is more suitably performed. And as for data not belonging to the cluster—that is, a wrong value for the cluster—accurate modeling is easily performed, wherein the evaluation value reflects robustness.

The experimental data used is the distribution data of a job description. There are three kinds: "projects related to Siebel", "projects related to Oracle", and "projects related to PeopleSoft". For each (the number is about 100), a proposal method using a mixture of Laplace distributions is compared with a mixture of normal distributions. The reader should note, however, that a constraint is added to ensure that the center of the cluster is a fraction.

With regard to the evaluation method, a clustering model is prepared with half of the data. The remaining data half is evaluated by the (average) distance from the center of the cluster that has the highest affiliation probability. In addition, the parameter of normal distribution and Laplace distribution is 0.05. For that matter, although randomly determined, there is no difference in the tendency of the result.

It has been found that the proposed method has a smaller $L_1$ error, so that it is confirmed that the proposed method is robust—at least in the sense of the $L_1$ error. The data further supports that present invention is fast. Since the optimization problem solved by the present invention can be formulated as general linear programming, it is possible to solve it with a linear programming method. So while it is difficult to discern whether it is faster than the linear programming method solver, by analogy with the comparison of the number of variables, the proposed method employs a structure inherent to the problem, so it is reasonable to conclude that the proposed method is faster.

Figure 3:
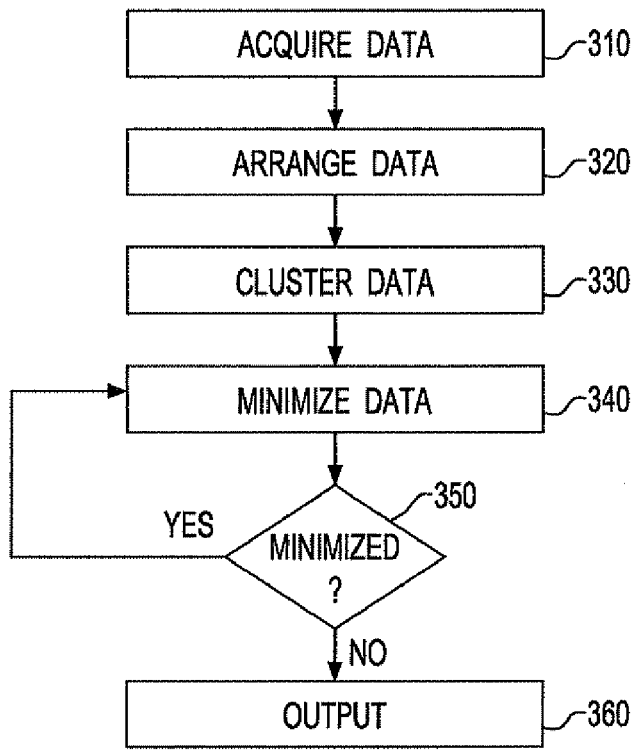
FIG. 3 is a schematic flow diagram of a workforce analysis method for allocating human resources using the novel algorithm for $L_1$-based distributional clustering of multinomial distributions.

FIG. 3 depicts a workforce analysis method (300) for solving $L_1$-based clustering problem of multinomial distributions of workforce data. The method is based on the algorithms and methods set forth herein. The first step of the method is acquiring the workforce allocation data, represented at block 310 of FIG. 3. The next step is to arrange the workforce data in proper form, as represented by the step of arranging the workforce allocation data in sets of fraction data with respect to the $L_1$ distances of block 320. The next step is for clustering as described herein. The clustering is represented by block 330, clustering the sets of fraction data t corresponding set of cluster centers, or $L_1$ distances for each set.

After clustering, the clustering data must be minimized based on $L_1$ distances. The minimizing step is represented by block 340, minimizing the sets of fraction data based on the cluster centers or $L_1$ distances. All of the data must be minimized. Hence, decision diamond 350 represents the step of determining whether all data are minimized. Finally, the output step, which provides the data relating to the patterns determined from the clustering and minimizing is represented by block 360.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

Figure 4:
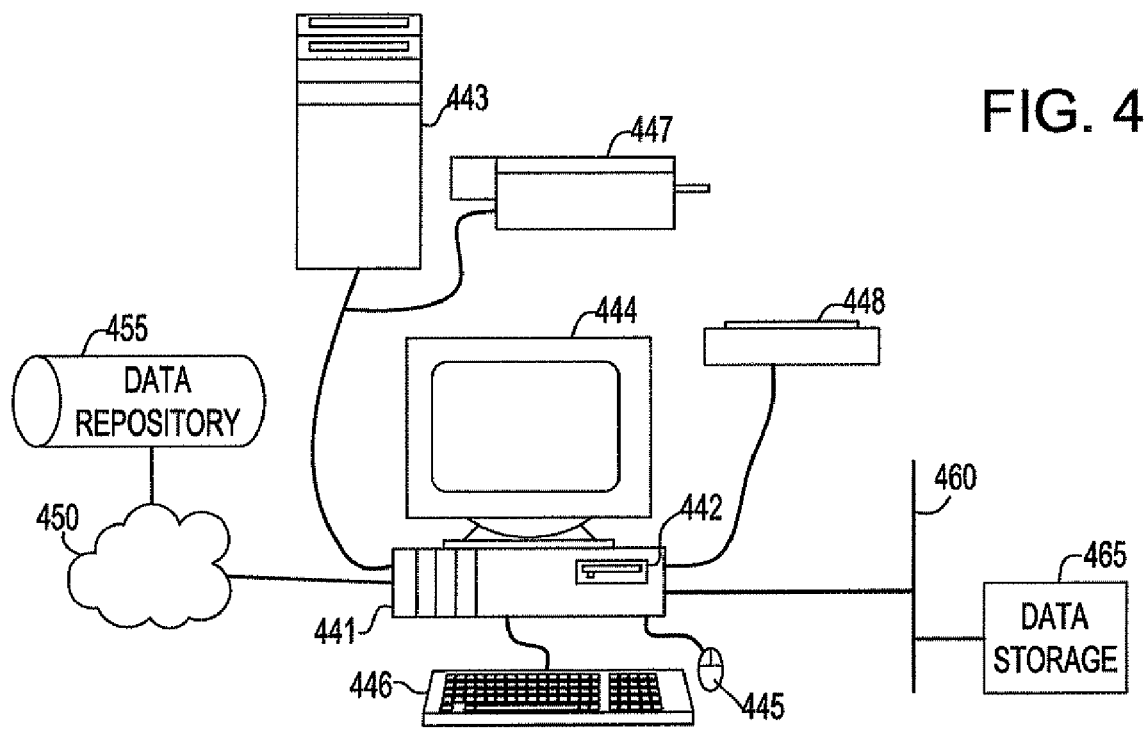
FIG. 4 is a schematic representation of a workforce management system that implements the novel method of FIG. 3.

A computer-based system 400 is depicted in FIG. 4 by which the method of the present invention may be carried out. Computer system 400 includes a processing unit 441, which houses a processor, memory and other systems components that implement a general purpose processing system or computer that may execute a computer program product. The computer program product may comprise media, for example a compact storage medium such as a compact disc, which may be read by the processing unit 441 through a disc drive 442, or by any means known to the skilled artisan for providing the computer program product to the general purpose processing system for execution thereby.

The computer program product comprises all the respective features enabling the implementation of the methods described herein, and which—when loaded in a computer system—is able to carry out these methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 441 (as mentioned) or may be located on a remote system such as a server 443, coupled to processing unit 441, via a network interface such as an Ethernet interface. Monitor 444, mouse 445 and keyboard 446 are coupled to the processing unit 441, to provide user interaction. Scanner 447 and printer 448 are provided for document input and output. Printer 448 is shown coupled to the processing unit 441 via a network connection, but may be coupled directly to the processing unit. Scanner 447 is shown coupled to the processing unit 441 directly, but it should be understood that such peripherals may be network coupled, or direct coupled without affecting the ability of the processing unit 441 to perform the method of the invention.

In the FIG. 3 exemplary embodiment, processing unit is shown connected to sources of workforce data for processing. The reader should note, however, that data for processing by the invention may be provided by any known means without deviating from the intended scope of the invention. In more detail, processing unit 441 is connected to a data repository 455 via an Internet, or network represented by element 450. Alternatively, the processing unit 441 may collect data for processing in data storage 465 through a network bus 460. The processing unit processes the data as set forth above in order to realize the pattern data outputs, and solutions.

Although a few examples of the present invention have been shown and described, it would be appreciated by those skilled in the art that changes may be made in these embodiments without departing from the principles and spirit of the invention, the scope of which is defined in the claims and their equivalents.

What is claimed is:

1. A computer-implemented workforce analysis method for solving L1-based clustering problem of multinomial distributions of workforce data, the method comprising the steps of:
   acquiring workforce allocation data;
   arranging the workforce allocation data in sets of fraction data with respect to the L1 distances;
   clustering the sets of fraction data t corresponding set of cluster centers, or L1 distances for each set;
   minimizing the sets of fraction data based on the cluster centers or L1 distances;
   and
   outputting analysis results of the clustering problem;
   wherein the steps are executed by a processor.

2. The workforce analysis method as set forth in claim 1, wherein problem is formulated as a linear programming model.

3. The workforce analysis method as set forth in claim 1, wherein the problem is a staffing template problem.

4. The workforce analysis method as set forth in claim 1, wherein the problem is a Dirichlet distribution problem.

5. The workforce analysis method as set forth in claim 1, including hierarchical clustering.

6. The workforce analysis method as set forth in claim 1, wherein the data are represented in word-ration form.

7. A workforce analysis system for performing L1-based clustering of multinomial distributions, the system comprising:
   a processor;
   means for acquiring workforce allocation data;
   means for arranging the workforce allocation data in sets of fraction data with respect to the L1 distances in the multinomial distributions;
   means for clustering the sets of fraction data t corresponding set of cluster centers, or L1 distances for each set in the multinomial distributions;
   means for minimizing the sets of fraction data based on the cluster centers or L1 distances;
   and
   means for outputting analysis results of the clustering problem.

* * * * *